Nov. 27, 1956    R. F. MASON    2,771,728
ROOT CROP HARVESTING AND CUTTING MACHINE
Filed June 22, 1953    3 Sheets-Sheet 1
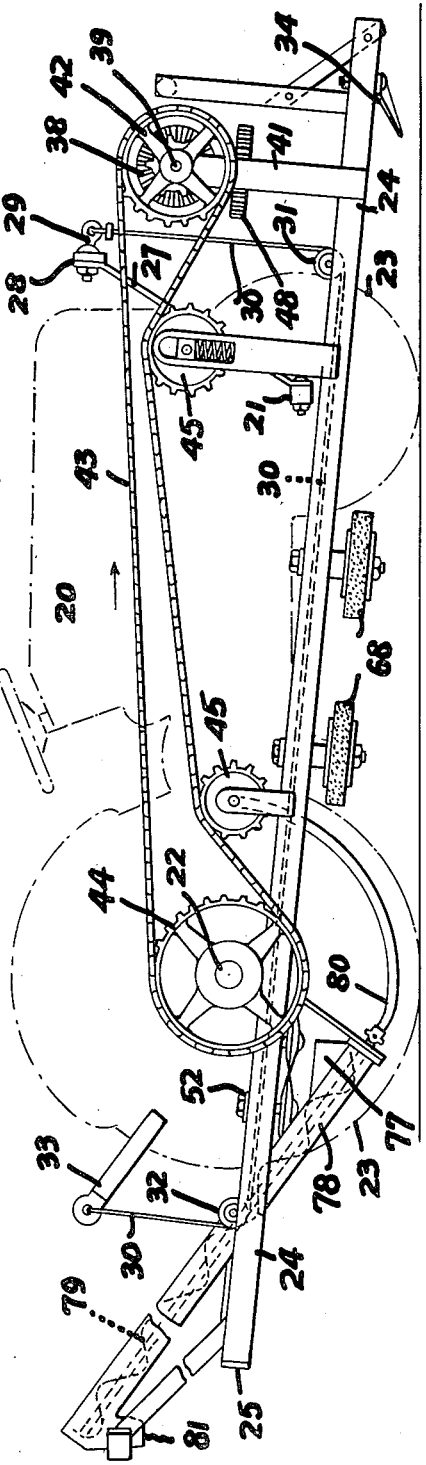
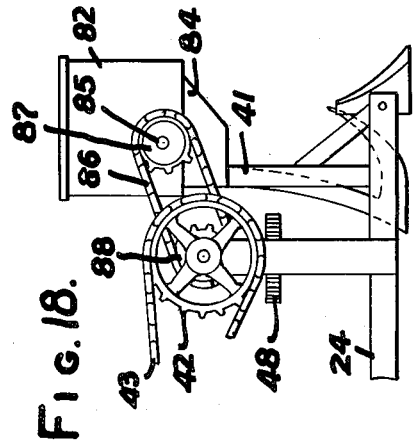
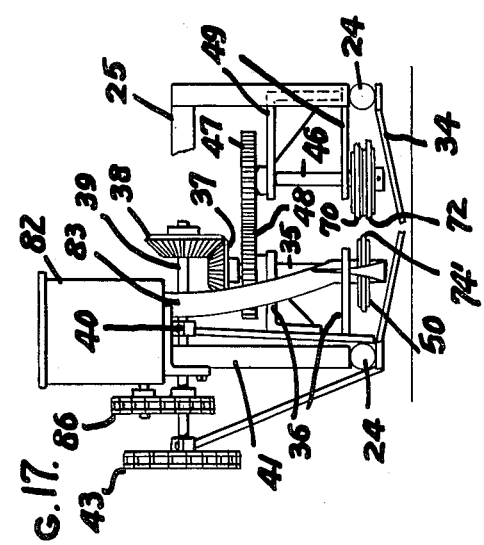
INVENTOR
ROBERT F. MASON
BY *Dwight B. Barr*
ATTORNEY

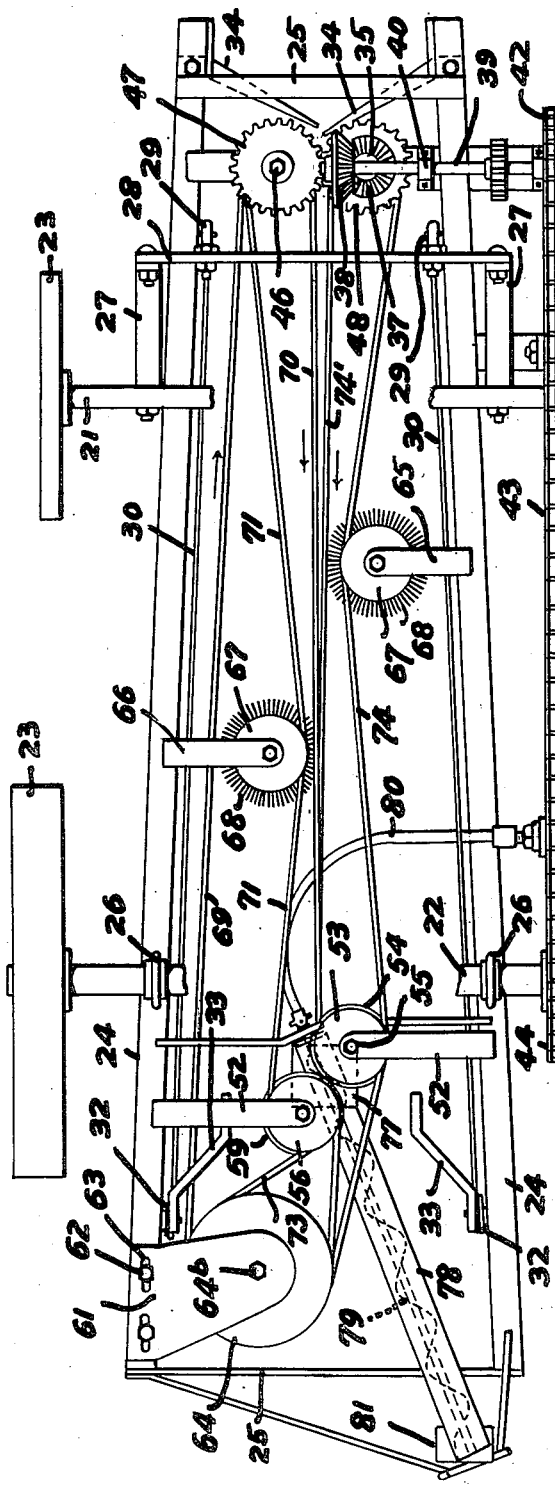

Nov. 27, 1956   R. F. MASON   2,771,728
ROOT CROP HARVESTING AND CUTTING MACHINE
Filed June 22, 1953   3 Sheets-Sheet 3
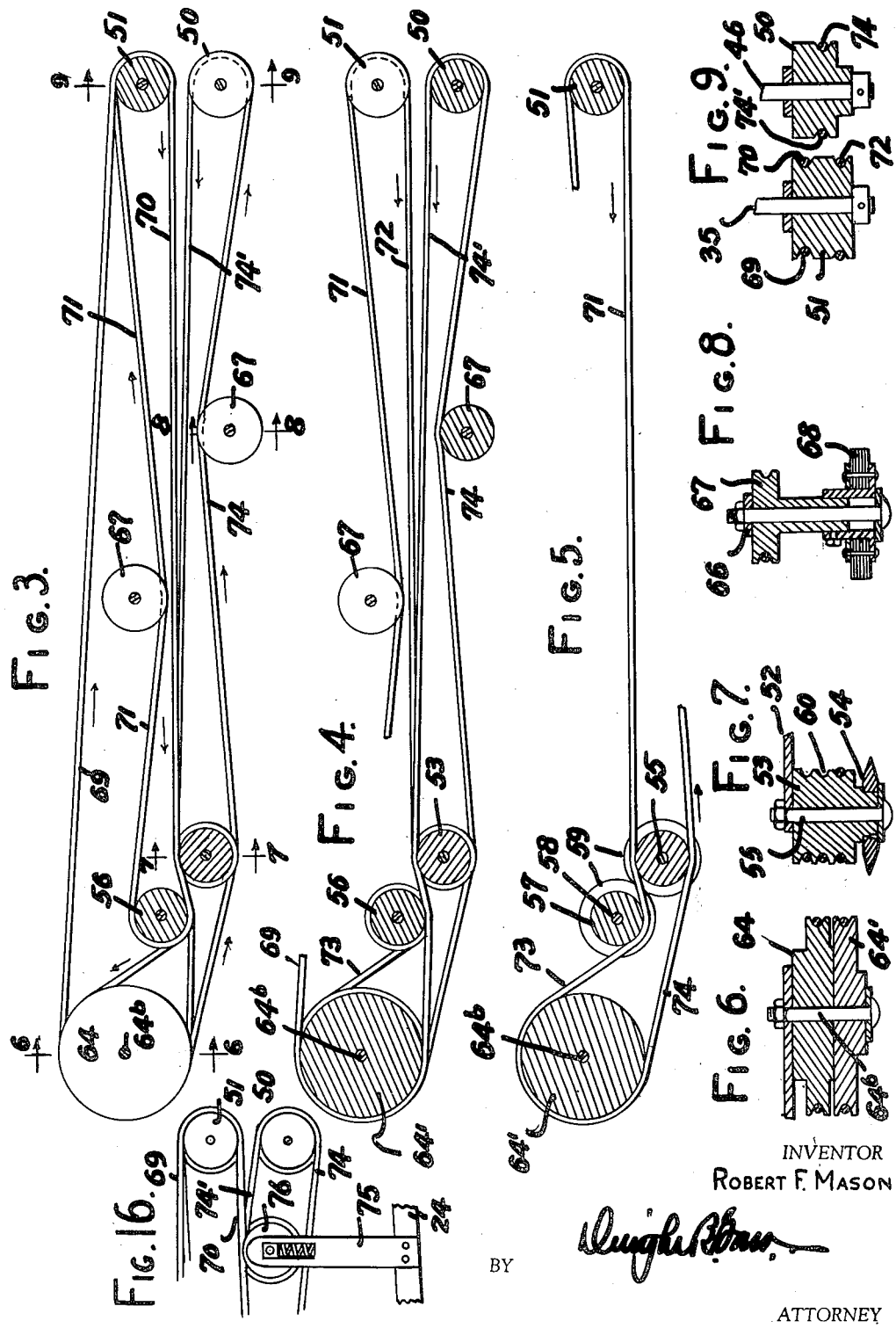
INVENTOR
ROBERT F. MASON
BY
ATTORNEY United States Patent Office 2,771,728
Patented Nov. 27, 1956

2,771,728

ROOT CROP HARVESTING AND CUTTING MACHINE

Robert Flay Mason, Magee, Miss.

Application June 22, 1953, Serial No. 363,035

1 Claim. (Cl. 55—51)

This invention is a harvesting machine adapted particularly for harvesting growing root crops such as peanuts, potatoes, beets, onions, etc., the primary object of the invention being to provide mechanical means whereby the root crop is first loosened from the soil without disturbing the crop, is then lifted by the stems of the plants upwardly and out of the soil, is then brushed so as to remove clinging dirt or soil from the root crop, then cut so as to sever the root crop from the stems, then followed by delivery of the root crop to a predetermined point or location.

A particular object of the invention is to provide all-mechanical means whereby the several operations above described are carried out smoothly, quickly, accurately, without damage, injury or loss of any of the root crop, as well as a complete separation after the cutting operation of the root crop from the stems and growth carried thereby.

A further object of the invention is to provide means of the character and for the purposes thus briefly set forth capable of being readily attached and operatively connected with tractor machines now generally in use with the exercise of ordinary mechanical skill and in such manner as to be ably operated from the power source of such tractors.

A further object of the invention is to provide a harvesting mechanism comprising a unitary structure for association in operative connection with tractors now in use and which includes means of simple nature whereby the power source of the tractor may be utilized to operate the harvesting mechanism.

A further object of the invention is to provide a harvesting machine of the character and for the purposes generally stated which includes means for mounting the same on a conventional tractor so as to be capable of being easily and accurately raised or lowered as desired in order to adapt the harvesting mechanism to different types of growing root crops.

With the foregoing objects in view, together with others which will appear as the description proceeds, the invention consists in the novel construction, combination and arrangement of parts, all as will be described more fully hereinafter, illustrated in the drawing, and particularly pointed out in the claim.

In the drawings:

Fig. 1 is a side elevation illustrating the outline of a conventional form of tractor and illustrating as applied thereto harvesting means constructed in accordance with my invention, Fig. 2 is a top plan view of the tractor, parts broken away, showing the harvester mechanism applied thereto, Fig. 3 is a diagrammatic sectional view illustrating, in plan, the cable or belt mechanism employed in gripping and lifting the growing crop from the ground, Fig. 4 is a similar view taken on a lower plane, Fig. 5 is a fragmentary plan view taken in still another plane; Figs. 3, 4 and 5 illustrating the manner in which the cables or belts are trained over the pulleys to bring about the desired results, Fig. 6 is a detail fragmentary sectional view taken on line 6—6 of Fig. 3, Fig. 7 is a similar view taken on line 7—7 of Fig. 3, Fig. 8 is a similar view taken on line 8—8 of Fig. 3, Fig. 9 is a similar view taken on line 9—9 of Fig. 3, Fig. 10 is a diagrammatic front elevation showing the manner in which the plows operate to loosen the root crop from the soil, Fig. 11 is a similar view showing how the cables or belts operate to grip the stems of the growing plant preparatory to lifting the latter from the soil, Fig. 12 is a view similar to Fig. 11 and showing the plant partly pulled from the soil, Fig. 13 is a similar view showing the growing plant lifted completely from the soil, Fig. 14 is a similar view showing the root crop as it is held by the cables and brought into contact with the brushes for removing the dirt or soil therefrom, Fig. 15 illustrates the plant being drawn by the gripping cables or belts through the cutting or severing mechanism, Fig. 16 is a fragmentary top plan view showing a slight modification including tightening means for the cable or belt flight, Fig. 17 is a front elevation of the improved harvesting machine and showing a modification including a fertilizing and seeding attachment, and Fig. 18 is a side elevation of the device shown in Fig. 17.

Referring now more particularly to the drawings, the body of the power tractor is indicated generally at 20, having front and rear axles 21 and 22 respectively, which carry traction wheels indicated at 23. It will be understood that the device of my invention may be so constructed as a unit as to be capable of ready attachment to tractors or other agricultural power machinery by simple methods.

The harvesting attachment of my invention is carried by a frame which includes spaced supporting sills 24 connected at their ends by transverse struts 25 to maintain rigidity in the frame of substantially rectangular form as shown. The frame will be of such length as to underlie the tractor 20 and to project at its forward end beyond the adjacent tractor end and similarly at the rear end beyond the rear of the tractor. In the drawings, for convenience of illustration, the sills 24 are shown as inclined toward one another from the rear to the front end thereof. This frame is provided with bearing members 26 secured inwardly from the rear end of the frame to rockably bear upon the rear axle 22 of the tractor 20; all said bearing members being secured to the sills as will be understood. This connection permits the frame to rock in a vertical direction upon the axle 22, as will be understood.

Secured to the front axle 21 of the tractor and projecting upwardly and forwardly therefrom are supporting posts 27, one disposed near each side of the tractor. These posts are connected at their upper ends by a cross bar 28, to which are attached a pair of securing eyes 29 one near each end of the said bar. These eyes have secured thereto the forward end of cables 30 which extend downwardly from the eyes 29 and pass around guide pulleys 31 rotatably carried by the sills 24, from whence the said cables 31 pass rearwardly to and around guide pulleys 32 rotatably secured to the said sills near the rear ends thereof; the said cables then passing upwardly to be secured to arms 33 connected to the tractor. From this construction it is apparent that movement of the lift arms in an upward direction will cause the cables 31 to be drawn rearwardly, whereupon the forward end of the harvester frame will be elevated. Lowering of the arms 33 will operate to lower the forward end of the harvester frame; the latter being pivotally secured as at 26 to the permanent axle 22 of the tractor. By this simple means the harvester frame may be accurately adjusted so as to govern the penetration of the cultivator blades, or to adapt the frame to different types of growing crops.

The forward end of the harvester frame is provided with a pair of inwardly and downwardly directed blades, shovels or diggers indicated at 34, the same being provided one upon each of the sills 24 and directed inwardly and rearwardly toward one another so as to meet approximately in the median longitudinal line of the harvester. It will be understood that any desired type of shovel or digger member may be employed, the only object being to engage beside and beneath the root crop so as to loosen the soil as the vehicle advances to enable the plants to be readily lifted therefrom.

The harvester frame has rotatably mounted near the forward end thereof and immediately behind the blades 34 a vertically disposed shaft 35, this shaft being firmly secured in brackets or supports 36 carried by the harvester frame. The upper end of this shaft is provided with a bevel gear 37 in mesh with a similar gear 38 affixed to a transverse or horizontally disposed shaft 39 mounted in suitable bearings 40 carried by an upstanding post 41 rigidly connected to one of the sills 24 of the frame. The shaft 39 extends laterally beyond and has affixed to the outer end thereof, a sprocket wheel 42 over which passes a drive chain 43 engaged at its rear end with the teeth of a sprocket 44 affixed to the drive axle 22 of the tractor. If desired, belt tighteners such as indicated at 45 are carried by the sill 24 of the frame to maintain the chain in proper tight condition.

Arranged at the forward end of the frame in spaced parallelism with the shaft 35 is a second shaft 46, and the shaft 46 has affixed to the upper end thereof a gear 47 intermeshed with a gear 48 affixed to the shaft 35. It will be observed, particularly with reference to Figs. 2 and 17, that the shafts 35 and 46 are disposed equal distances on opposite sides of the longitudinal center of the harvester frame. The shaft 46 is properly supported for rotation in the brackets 49 carried by the frame. It is obvious from this construction that as the tractor moves forwardly, the chain 43 will rotate shaft 39 in clockwise direction, and the shaft 39, through gears 38—37, will cause the intermeshed gears 47—48 to rotate respectively in clockwise and counterclockwise directions.

The lower end of vertically disposed shaft 35 has affixed thereto a single pulley 50, while the corresponding end of shaft 46 is provided with a double pulley indicated at 51. It will be observed that these pulleys are disposed in horizontal planes with the groove of pulley 50 disposed in a plane substantially midway the spaced grooves of double pulley 51. It will also be observed that the peripheries of these pulleys 50—51 are disposed equal distances beyond the median line of the harvester frame.

Near the rear end of the harvester frame and projecting inwardly in spaced parallelism from one another from opposite sills 24 of the frame are supporting arms 52. One of these arms has rotatably mounted thereon a triple groove pulley 53, to the lower end of which is secured to a rotary knife 54. The pulley 53 rotates freely upon the supporting shaft 55 carried by the arm 52. The opposite arm 52 carries a pair of spaced pulleys 56—57, rotatable upon shaft 58 depending from the inner end of the said supporting arm. The pulley 57 has secured thereto a rotary cutting blade 59 similar to the blade 54. The adjacent peripheries of the pulleys carried by shafts 55—58 extend beyond or intersect the longitudinal center of the harvester frame, and the spaced pulleys 56—57 have their grooves in longitudinal alignment with the grooves of the double pulley 51 at the forward end of the frame. The medial groove 60 of the triple pulley 53 is aligned longitudinally of the frame with the groove of single pulley 50 supported by vertical shaft 35 at the forward end of the harvester frame. The upper and lower grooves of triple pulley 53 will be in substantially horizontal alignment with the grooves of double pulley 51 carried by the vertical shaft 46 at the forward end of the frame.

Projecting inwardly from one of the sills 24 of the harvester frame and near the extreme rear end thereof is a bracket 61, the latter being mounted for limited adjustment longitudinally of the frame by the bolt and slot connection 62—63. The inner end of this bracket rotatably supports a pair of master pulleys 64—64' rotatable independently of one another upon the shaft 64$^b$. It will be observed that these master pulleys are adjacent to and rearwardly of the pulleys 53—56.

Projecting inwardly from the side sills 24 of the harvester frame and substantially in the medial portion thereof are arms 65 and 66. These arms are spaced from one another longitudinally of the frame and each carries a pulley 67. Each of these pulleys has its groove in substantial alignment longitudinally of the frame with the grooved pulleys 50—51 at the forward end of the frame. Each pulley also has secured thereto in a plane substantially below the horizontal plane of the pulleys a rotary brush indicated at 68.

A continuous or endless cable, belt or cord passes around the several pulleys in a manner now to be described. The cable 69 passes from the master pulley 64 in a direction forwardly of the frame, around the uppermost groove of the double pulley 51 and rearwardly therefrom to provide the flight 70, thence around upper pulley 56 carried by shaft 58, then forwardly to provide flight 71 engaging the groove of pulley 67 to rotate the latter and the brush carried thereby, thence forwardly and around the lower groove of double pulley 51, thence rearwardly to provide flight 72 in spaced parallelism with its companion flight 70, thence around the lower pulley on shaft 58 to provide flight 73, thence around the lowermost pulley 64' of the master pulley moving forward therefrom as flight 74 engaging in groove of pulley 67 supported by arm 65, thence forwardly around single pulley 50 at the forward end of the frame, thence rearwardly to provide flight 74' over the medial groove of triple pulley 53 and back to the uppermost of master pulley 64.

The arrangement of the pulleys is such that the cables of flights 70 and 72 move rearwardly and longitudinally of the frame spaced apart vertically, while flight 74' travels rearwardly in a plane midway between upper and lower flights 70—72. Due to the fact that the pulleys supported by shafts 55 and 58 have their adjacent peripheries in overlapping relationship, or beyond a line passing longitudinally midway of the frame, the flights 70, 72 and 74' converge when they reach the pulleys carried by shafts 55—58. If desired, this convergence may be brought about nearer to the forward end of the frame by providing idlers in any desired number and location as shown in Fig. 16. In the said figure an arm 75 secured at one end to a side sill 24 projects inwardly of the frame and carries a spring supported idler pulley 76 to engage with flight 74'; the spring supported pulley being so arranged as to move the said flight 74' into substantially the same vertical plane with the companion flights 70—72.

From this construction it is apparent that as the vehicle advances, the plows or blades 34, having previously been properly adjusted, engage with the ground one upon each side of the row of plants to loosen the roots thereof from the soil, as shown particularly in the diagrammatic view Fig. 10. As the vehicle advances, the row of growing plants falls in the line midway the sides of the frame, whereupon the flight 70—72—74' engage the stalks or stems of the plants and as the frame advances and the flights converge a clamping action of the said flights upon opposite sides of the stems or stalks causes the said stalks to be firmly gripped thereby. Due to the fact that the harvester frame inclines upwardly to the rear of the vehicle, as shown more particularly in Fig. 1, the entire plant is lifted from the ground as shown in Figs. 12 and 13. As this rearward movement of the plant progresses, the root portion thereof comes into contact successively with the rotating brush members 67, which action brushes clinging dirt and soil from the root portions, after which the plant, rid of such soil or dirt, passes between the cutting blades 59 to sever the stems from the root portions. The severed tops drop to one side, while the root portions fall into a hopper 77 (Fig. 1) immediately below the rotary knives, and into the upwardly and rearwardly inclined tube 78 having therein a worm conveyor 79. This conveyor is driven by a flexible shaft 80 which receives its rotative power from sprocket idler 45. The rearward end of the tube 78 is provided with an outlet funnel or spout 81. This spout may be so located as to deliver the harvested nuts, potatoes, beets, onions or other root plants to a vehicle (not shown) which may be connected to the rear of the tractor so as to follow the latter as it progresses. The tractor will be so driven as to move longitudinally of the row of growing plants so that the upstanding stalks or stems thereof will pass between the spaced pulleys 50—51 at the forward end of the frame. As the tractor advances, the stalks of successive plants are engaged and clamped between the flights 70, 72 and 74', being gradually elevated due to the inclination of the frame in an upward direction rearwardly of the vehicle so as to lift the entire plants free from the ground. As before stated, the frame may be adjusted vertically so as to adapt the harvester to different types of growing crops, and obviously the diggers, agitators or plows 34 may be changed to suit the various types of crops operated upon. After the brushing operation, the roots are severed from the tops, and the latter may either be dropped upon the ground or may be passed to a suitable receptacle or vehicle as desired; the root crop being dropped into the hopper from whence it is passed by the spiral conveyor 79 to the discharge outlet 81 and into a proper vehicle or receptacle.

It will be understood that the belt or cable driving means will be so timed that the plant stalk gripping flights will engage and lift the plants vertically from their engagement with the ground. In other words, the rate of travel of the tractor in a forward direction will be timed with the rate of travel of the plant engaging belt or cable flights so that the plants will be lifted and conveyed in a direction rearwardly of the frame without dragging action.

The present illustration and description discloses a single endless belt or cable passed around the various guide rollers or pulleys so as to bring about flights which cooperate with one another in a stalk gripping action as the machine advances.

In addition to a harvesting operation, the device of my invention may by very simple means be utilized as a planter or fertilizer. With reference particularly to Figs. 17 and 18, the upstanding post 41 may be provided with a hopper 82, having a delivery spout 83 leading therefrom to a position at the lower forward end of the frame. The hopper may also be equipped with a fertilizer container 84 so that fertilizer and seed may be delivered through the distributor spout at the same time, and to facilitate proper flow and distribution of the seed and fertilizer, an agitator (not shown) but driven from shaft 85 may obtain its rotative power by means of a chain 86 passing over a sprocket 87 on shaft 85 and a similar sprocket 88 secured to shaft 39.

From the foregoing it is obvious that I have provided a tractor attachment for harvesting and operating upon root crops which is of extremely simple construction and which has its mechanical parts so assembled and arranged as to be readily driven either from the axle of the tractor with which it is associated, or from the power source of the tractor.

While the device here shown and described is the simplest adaptation of my inventive idea, it will be understood that variations in the mechanical details and the construction and assemblage of the parts may be made within the spirit of the invention as defined by the claim.

I claim:

In a harvesting machine for root crops, a vehicle having front and rear spaced parallel axles, a rigid rectangular frame disposed beneath said vehicle with its sides disposed inwardly from the ends of said axles and with its ends projecting beyond said axles and pivoted inwardly from its rear end to said rear axle, diggers secured to and movable with said frame forwardly of said front axle, root crop elevating and cutting mechanism mounted on and movable with said frame rearwardly of and in alignment with said diggers, a sprocket wheel on said rear axle, power means on said frame for operating said elevating and cutting mechanism, a sprocket chain passing over said sprocket wheel and operatively connected with said elevating and cutting means, and means operatively associated with said frame for rocking said frame about said pivot.

References Cited in the file of this patent

UNITED STATES PATENTS

| | | |
|---|---|---|
| 844,476 | Seierup | Feb. 19, 1907 |
| 938,881 | Lee et al. | Nov. 2, 1909 |
| 1,102,272 | Jensen | July 7, 1914 |
| 1,467,650 | Pond et al. | Sept. 11, 1923 |
| 1,883,666 | Flintjer | Oct. 18, 1932 |
| 2,197,225 | Pierson | Apr. 16, 1940 |
| 2,291,093 | Hurst et al. | July 28, 1942 |
| 2,368,895 | Spiegl | Feb. 6, 1945 |